United States Patent [19]

Wallis

[11] Patent Number: 5,271,151

[45] Date of Patent: Dec. 21, 1993

[54] METHOD OF MAKING A HIGH PRESSURE CONDENSER

[76] Inventor: Bernard J. Wallis, 2215 Dacosta, Dearborn, Mich. 48128

[21] Appl. No.: 838,371

[22] Filed: Feb. 19, 1992

Related U.S. Application Data

[62] Division of Ser. No. 512,744, Apr. 23, 1990, abandoned.

[51] Int. Cl.$^5$ ............................................. B23P 15/26
[52] U.S. Cl. ........................... 29/890.053; 29/890.054; 29/890.07
[58] Field of Search ............... 29/890.039, 890.053, 29/890.054, 890.07; 228/183

[56] References Cited

U.S. PATENT DOCUMENTS

| | | | |
|---|---|---|---|
| 3,425,113 | 2/1969 | Ward, Jr. | 29/890.039 |
| 3,757,855 | 9/1973 | Kun et al. | 29/890.039 |
| 3,757,856 | 9/1973 | Kun | 29/890.039 |
| 3,839,975 | 10/1974 | Tranel | 29/890.039 |
| 4,179,781 | 12/1979 | Long | 29/890.039 |
| 4,503,906 | 3/1985 | Andres et al. | 29/890.039 |
| 4,595,135 | 6/1986 | Wallis | 228/17 |
| 4,688,631 | 8/1987 | Peze et al. | 29/890.039 |
| 4,896,411 | 1/1990 | Dempsey | 29/890.039 |
| 4,932,469 | 6/1990 | Beatenbough | 29/890.07 |
| 4,947,548 | 8/1990 | Bentley | 29/890.039 |
| 4,971,240 | 11/1990 | Wallis | 228/146 |

FOREIGN PATENT DOCUMENTS

| | | | |
|---|---|---|---|
| 0351044 | 1/1990 | European Pat. Off. | 29/890.054 |
| 2423633 | 11/1975 | Fed. Rep. of Germany | 29/890.07 |
| 2356898 | 1/1978 | France | 29/890.039 |
| 0071943 | 3/1991 | Japan | 29/890.054 |
| 1285155 | 8/1972 | United Kingdom | 29/890.039 |

*Primary Examiner*—Irene Cuda
*Attorney, Agent, or Firm*—Barnes, Kisselle, Raisch, Choate, Whittemore & Hulbert

[57] ABSTRACT

Tubes for a high pressure condenser are made by utilizing flat strip stock that is coated on both surfaces with a coating that will fuse and bond on the application of heat and has a plurality of longitudinally and transversely spaced deformed portions or projections. The flat strip stock is subjected to the steps of first rolling the opposite edges of the strip into a curved configuration then progressively rolling the central portion of the strip into the rounded configuration desired along a longitudinal edge of the tube while utilizing the rounded free edge portions and the center bend to accurately center the strip as it advances through the successive forming rolls and, thereafter heating the spaced free edges of the rolled strip to a temperature at which they are fused together and directing them through a guide located upstream from and directly adjacent a pair of squeeze rolls for effecting a weld seam therebetween, the guide being designed to engage each free edge portion of the strip on laterally opposite sides thereof. The projections in the strip are brought into engagement before the free edges of the rolled strip are fused together. When the tubes are assembled with the fins to the headers, the entire assembly is subjected to heat to cause the coating on the surfaces of the tubes to bond the projections to one another and to bond the exterior of the tubes to the slots in the headers through which the ends of the tubes extend.

5 Claims, 5 Drawing Sheets

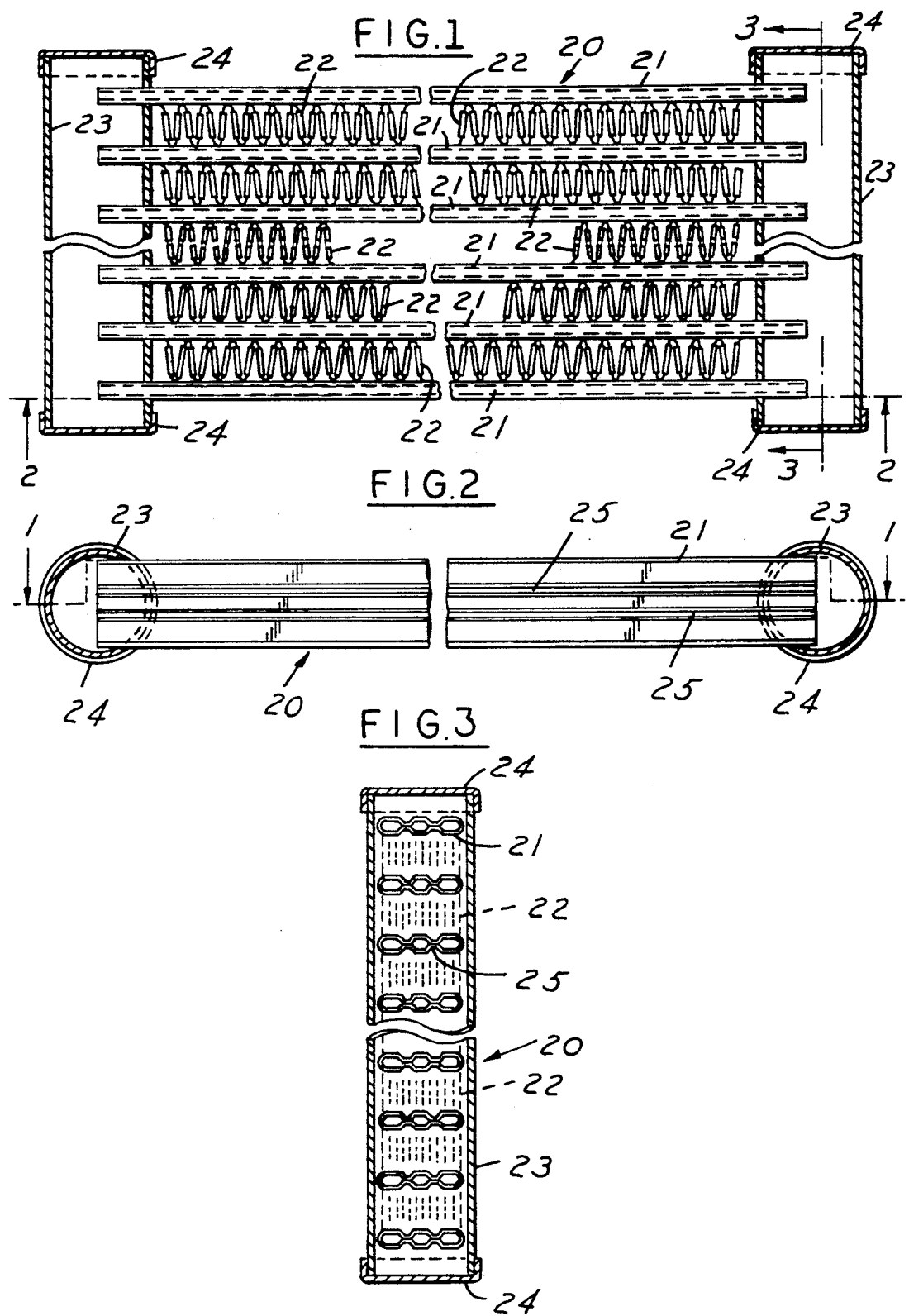

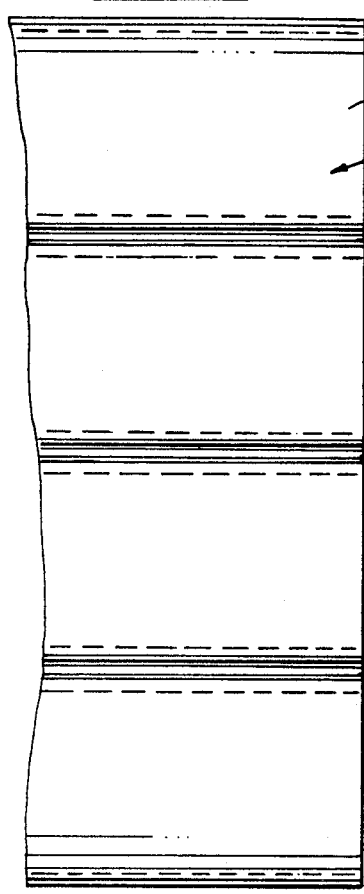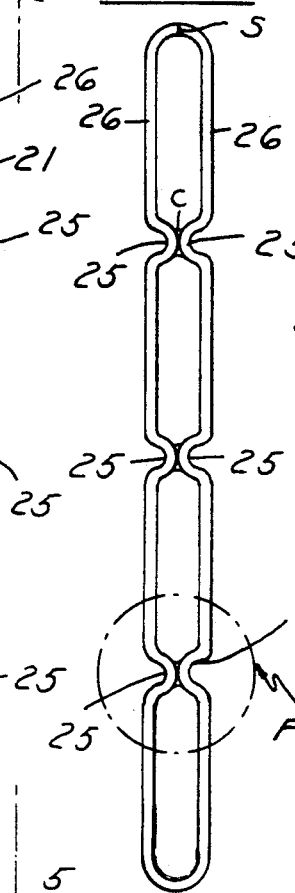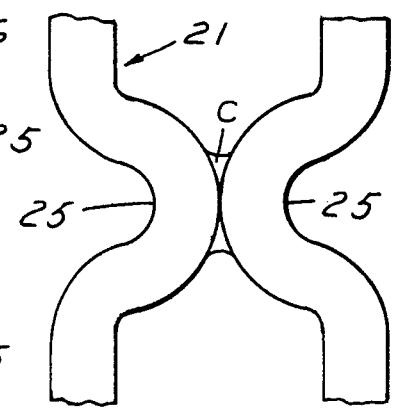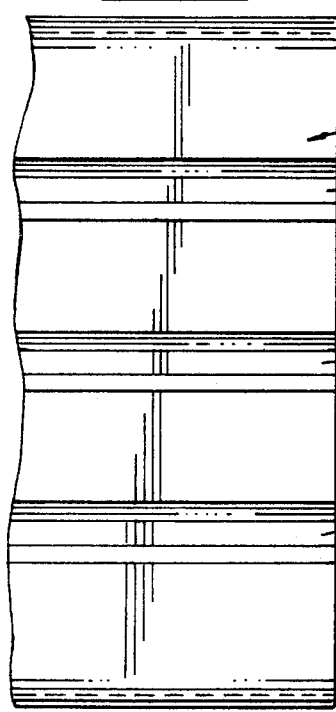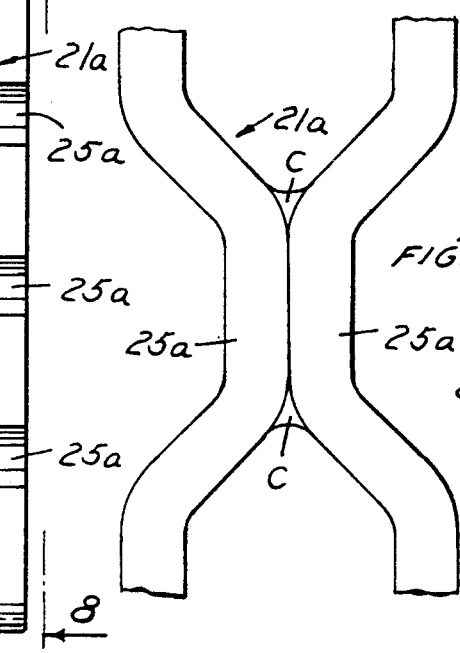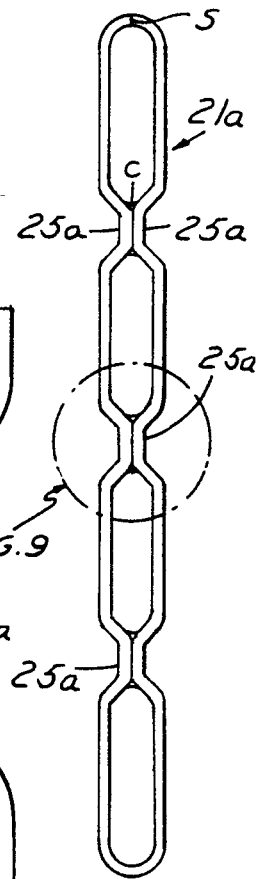

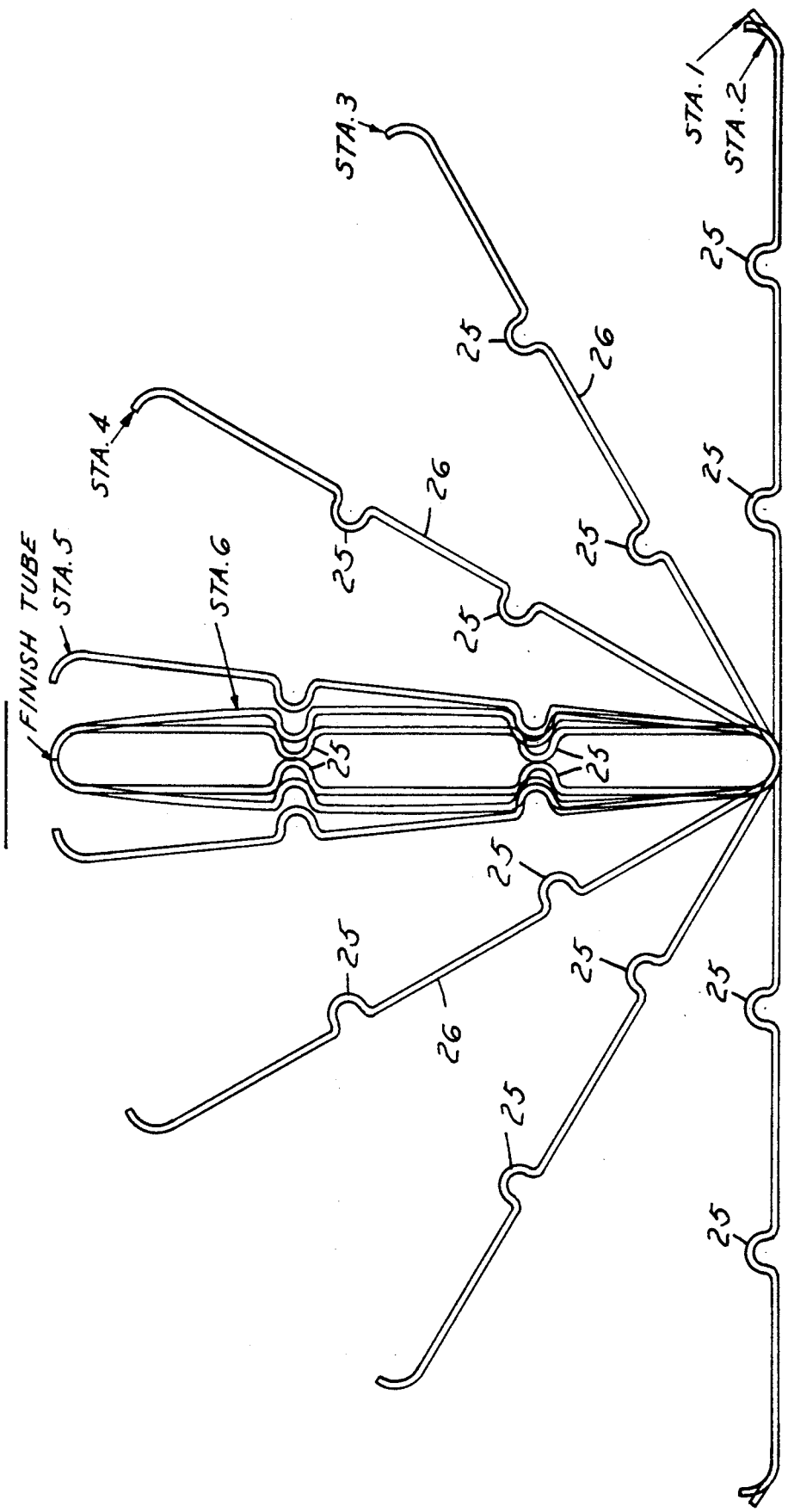

METHOD OF MAKING A HIGH PRESSURE CONDENSER

This is a division of Ser. No. 07/512,744, filed on Apr. 23, 1990, now abandoned.

This invention relates to high pressure heat condensers and to a method of making such a condenser.

BACKGROUND AND SUMMARY OF THE INVENTION

In the manufacture of heat exchangers and particularly high pressure heat exchangers, known condensers, one of the problems is the high pressure of the material handled such as refrigerant requires either that the tubes utilized in the condenser be thick or be extruded with sufficient thickness to provide multiple paths that have adequate strength.

The tubes must be reinforced or the walls thereof thickened.

Thus, in one commercial form which has been utilized, it is common to provide a plurality of flat extruded tubes that have longitudinally extending channels for the refrigerant, headers at each end of the tubes which are bonded to the tubes and a plurality of sheets having openings through which the tubes extend to provide fins.

SUMMARY OF THE INVENTION

Among the objectives of the present invention are to provide an improved condenser which can be made of lighter materials and a novel method of making the condenser.

In accordance with the invention, a high pressure condenser comprising a plurality of transversely spaced flattened tubes having their ends extending into headers at each end to the tubes and a plurality of undulating fins extending between adjacent tubes. The tubes are made by utilizing flat strip stock that is coated on both surfaces with a coating that will fuse and bond on the application of heat and has a plurality of longitudinally and transversely spaced deformed portions or projections. The flat strip stock is subjected to the steps of first rolling the opposite edges of the strip into a curved configuration having a radius corresponding to the radius of curvature desired on the rounded longitudinally welded edge of the tube, then progressively rolling the central portion of the strip into the rounded configuration desired along the other longitudinal edge of the tube while utilizing the rounded free edge portions and the center bend to accurately center the strip as it advances through the successive forming rolls and, thereafter heating the spaced free edges of the rolled strip to a temperature at which they are adapted to be fused together and directing them through a guide located upstream from and directly adjacent a pair of squeeze rolls for effecting a weld seam therebetween, the guide being designed to engage each free edge portion of the strip on laterally opposite sides thereof. The projections in the strip are brought into engagement before the free edges of the rolled strip are fused together. When the tubes are assembled with the fins to the headers, the entire assembly is subjected to heat to cause the coating on the surfaces of the tubes to bond the projections to one another and to bond the exterior of the tubes to the slots in the headers through which the ends of the tubes extend.

DESCRIPTION OF THE DRAWINGS

FIG. 1 is a part sectional elevational view of a condenser embodying the invention taken along the line 1—1 in FIG. 2.

FIG. 2 is a sectional view taken along the line 2—2 in FIG. 1.

FIG. 3 is a sectional view taken along the line 3—3 in FIG. 1.

FIG. 4 is a plan view of a tube utilized in the condenser shown in FIGS. 1-3.

FIG. 5 is an end view taken along the line 5—5 in FIG. 4.

FIG. 6 is a fragmentary view on an enlarged scale of the portion shown in the circle 6 in FIG. 5.

FIG. 7 is a fragmentary plan view of a modified form of tube.

FIG. 8 is an end view taken along the line 8—8 in FIG. 7.

FIG. 9 is a fragmentary view on an enlarged scale in the circle shown in FIG. 9 of FIG. 8.

FIG. 17 is a schematic view showing the progressive cross sectional configuration of the strip stock as it is formed into the finished tube.

DESCRIPTION

Figure 10:
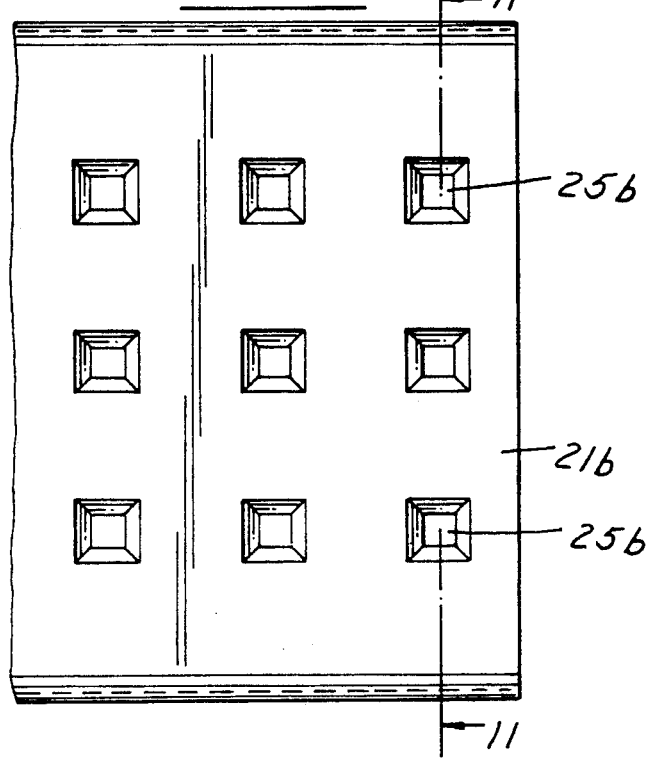
FIG. 10 is a fragmentary plan view of further modified form of tube.
Figure 11:
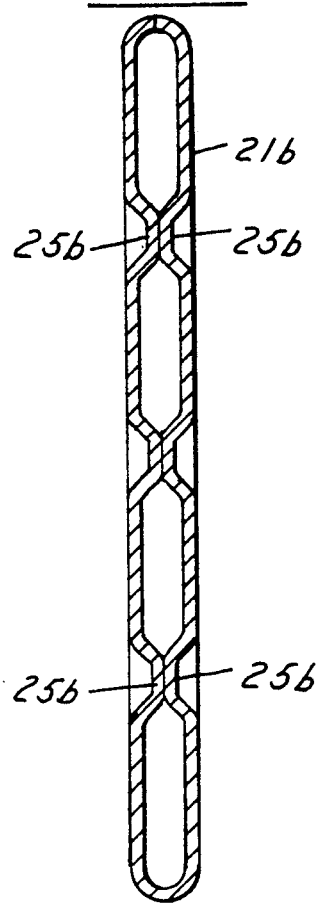
FIG. 11 is a sectional view taken along the line 11—11 in FIG. 10.
Figure 12:
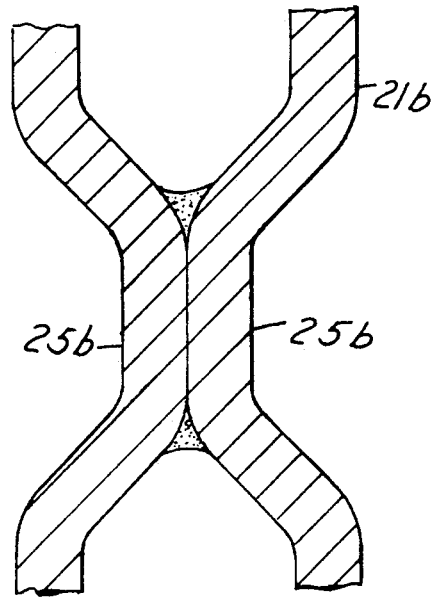
FIG. 12 is a fragmentary view on an enlarged scale of a portion of the tube shown in FIG. 11.

Referring to FIGS. 1-6, the high pressure condenser 20 comprises a plurality of parallel transversely spaced flattened tubes 21 with undulating heat exchange fins 22 therebetween extending along the length of the tubes 21. The ends of the tubes 21 extend through slots having the cross section of the tubes into tubular headers 23 that have end caps 24.

The various components are made of metal having a coating on the inner and outer surfaces thereof which will fuse and bond upon application of heat. For example, in the case of aluminum the coating may comprise cladding. In the case of copper or brass the coating may comprise solder, the tubes 21 have a coating on both the interior and exterior as presently described.

As shown in FIGS. 4-6 the tubes 21 have a plurality of longitudinally extending indentations 25 which form projections that abut one another and are fused to one another by the coating on the inner surface at C. The tubes are formed by progressively rolling a strip to bring the ends of the tube into engagement so that they are fused at S when the tube is heated. The exterior surface of the tube is bonded to the header 23 and the fins 22 through the coating upon application of heat to the assembly, as do the fins 22.

In the forms shown in FIGS. 7-9, the tubes 21a have flattened abutting portions 25a which are similarly bonded.

Figure 13:
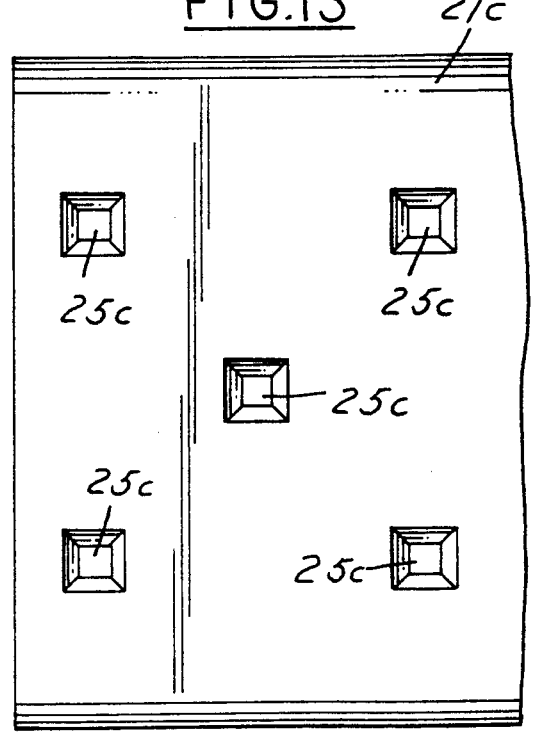
FIG. 13 is a fragmentary plan view of a further modified form of tube.

In the form shown in FIG. 10 longitudinally and transversely spaced indentations 25b which are frusto-conical are in abutment on the tubes 21b in the tube 21c shown in FIG. 13, the indentations 25c on the outer rows are staggered with respect to indentations 25c in an inner row.

Figure 14:
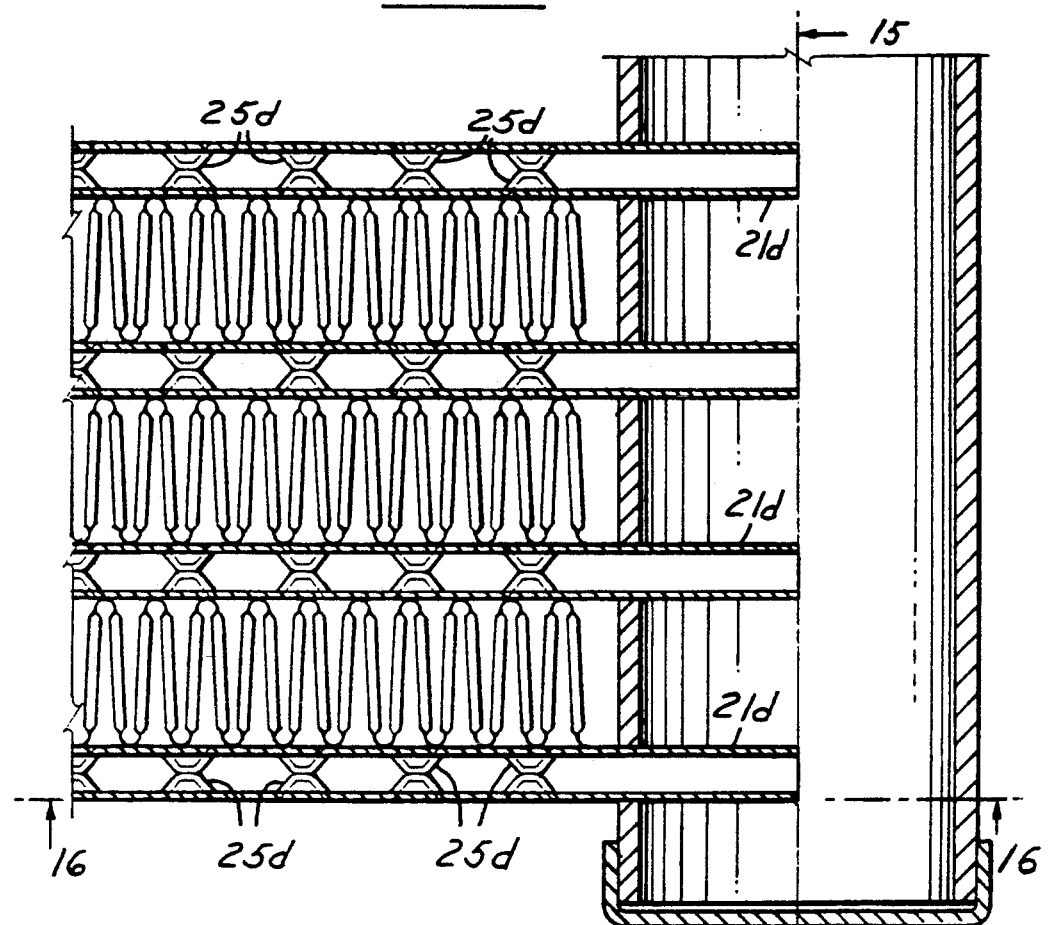
FIG. 14 is a fragmentary sectional view of a modified form of condenser.
Figure 15:
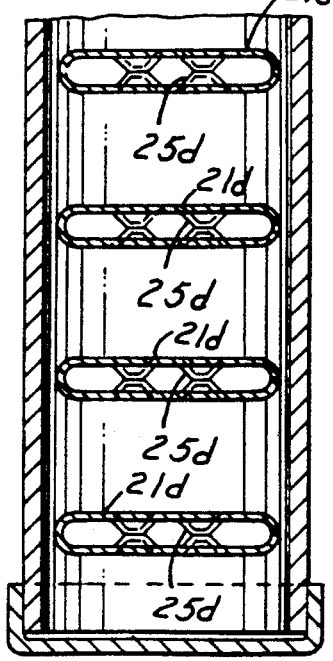
FIG. 15 is a fragmentary sectional view taken along the line 15—15 in FIG. 14.
Figure 16:
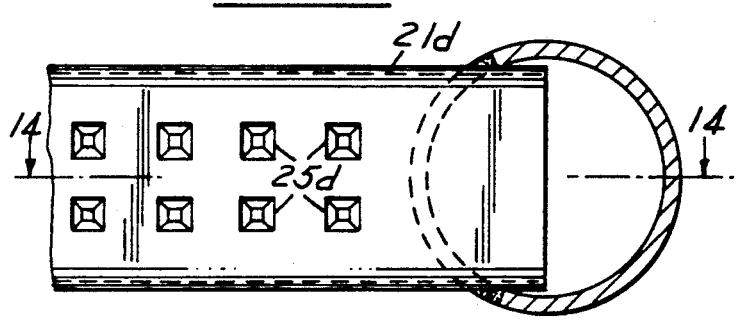
FIG. 16 is a fragmentary view taken along the line 16—16 in FIG. 14.

In the form shown in FIGS. 14-16, each tube 21d has two rows of longitudinally spaced indentations 25d.

The tubes are preferably made from strip stock which is coated with a coating on the inner and outer surfaces that will bond at high temperature, the coating being applied to surfaces of the strip. The method comprises the steps of first rolling the opposite edges of the strip into a curved configuration having a radius corresponding to the radius of curvature desired on the rounded longitudinally welded edge of the tube, then progressively rolling the central portion of the strip into the rounded configuration desired along the other longitudinal edge of the tube while utilizing the rounded free edge portions and the center bend to accurately center the strip as it advances through the successive forming rolls and, thereafter heating the spaced free edges of the rolled strip to a temperature at which they are adapted to be fused together and directing them through a guide located upstream from and directly adjacent a pair of squeeze rolls for effecting a weld seam therebetween, the guide being designed to engage each free edge portion of the strip on laterally opposite sides thereof. The projections in the strip are brought into engagement before the free edges of the rolled strip are fused together. When the tubes are assembled with the fins to the headers, the entire assembly is subjected to heat to cause the coating on the surfaces of the tubes to bond the inner surface of the projections to one another and to bond the exterior of the tubes to the slots in the headers through which the ends of the tubes extend. The strip is progressively rolled after the indentations are formed therein and an additional rolling step is provided wherein initially the opposite edges of the flat strip are rolled by restraining the free ends of the side edges and bending the side edges into a configuration comprising flat side edge portions connected by a radius portion to the central flat portion of the strip and extending at an acute angle to the flat central portion of the strip. This partially curved configuration serves as a guide to accurately position the strip as it moves into the next step of rolling the opposite flat edge portions of the strip into a curved configuration having a radius corresponding to the radius of curvature desired on the rounded longitudinally welded edge of the tube. The strip is then moved through the successive steps of progressively rolling the central portion of the strip into the rounded configuration desired along the other longitudinal edge of the tube while utilizing the rounded free edge portions and the center bend to accurately center the strip as it advances through the successive forming rolls and, thereafter heating the spaced free edges of the rolled strip to a temperature at which they are adapted to be fused together and directing them through a guide located upstream from the directly adjacent a pair of squeeze rolls for effecting a weld seam therebetween, the guide being designed to engage each free edge portion of the strip on laterally opposite sides thereof.

As previously indicated after the tubes are formed and the free edges of the strip are bonded to one another by localized heating, the tubes, fins and headers are assembled and the entire assembly is then subjected to heat to cause the exterior surface of the ends of the tubes to be bonded to the headers, the fins to be bonded to the tubes and the indentations to be bonded to one another by the coating on the interior of the tubes.

It can thus be seen there has been provided a high pressure condenser which can be made of lightweight material and an improved method of making the condenser.

What is claimed is:

1. The method of forming a high pressure condenser comprising a plurality of flattened tubes having two longitudinally extending rounded edges, the ends of which extend into slots in a header, providing a flat strip stock with a coating on both surfaces thereon, the method comprising forming spaced indentations in said strip, subjecting the strip to the steps of first rolling the opposite edges of the strip into a curved configuration having a radius corresponding to the radius of curvature desired on one rounded edge of a tube, then progressively rolling the central portion of the strip into the rounded configuration, desired along the other longitudinal edge of the tube while utilizing the rounded edge portions and the center portion to accurately center the strip as it is advanced through the successive forming rolls, thereafter heating the spaced free edges of the rolled strip to a temperature at which the edges will fuse together and directing them through a guide located upstream from and directly adjacent a pair of squeeze rolls for effecting a weld seam therebetween, the guide being designed to engage each free edge portion of the strip on laterally opposite edges thereof, bringing projections in the strip into engagement, and assembling the tubes with the fins to the headers with the ends of the tubes extending into slots into the headers, subjecting the entire assembly to heat to cause the coating on the surfaces of the tubes to bond the projections to one another, to bond the exterior of the tubes to the slots in the headers through which the tubes extend, and to bond the fins in the tubes.

2. The method set forth in claim 1 wherein said step of forming indentations comprises forming longitudinally extending transversely spaced indentations.

3. The method set forth in claim 1 wherein said step of forming indentations comprises forming longitudinally and transversely spaced indentations.

4. The method set forth in claim 3 wherein said indentations are in longitudinally aligned rows.

5. The method set forth in claim 1 wherein said step of forming said indentations comprises forming said indentations in one row such that they are staggered longitudinally with respect to indentations in an adjacent row.

* * * * *